March 15, 1960  B. S. MUNDIE  2,928,259
FROZEN FOOD PACKAGE MOLD
Filed July 24, 1956  2 Sheets-Sheet 1
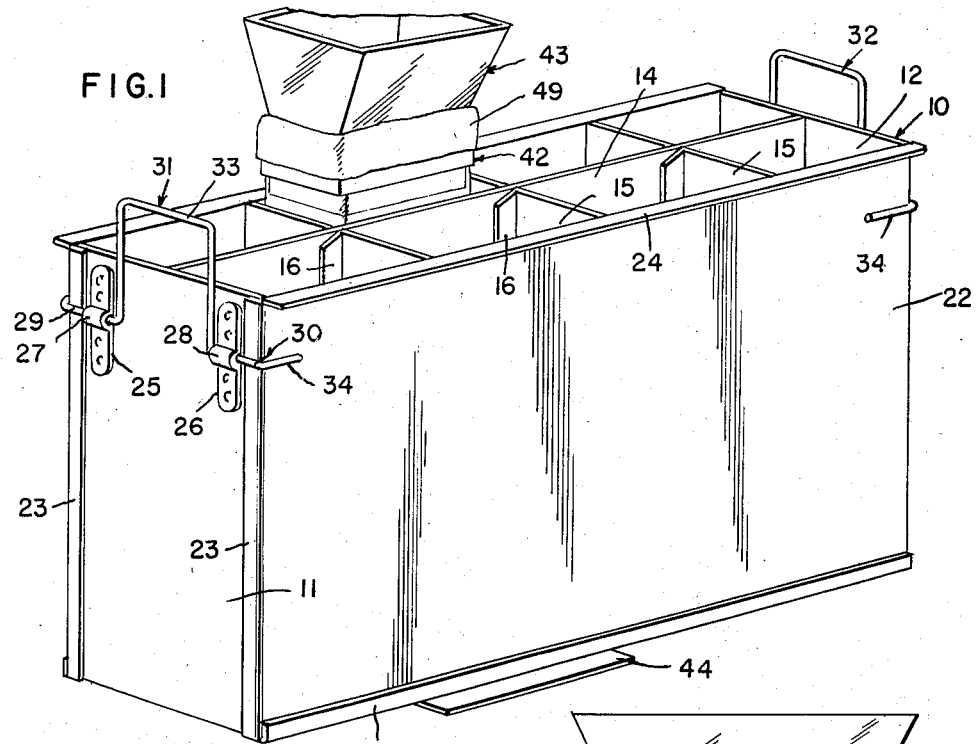
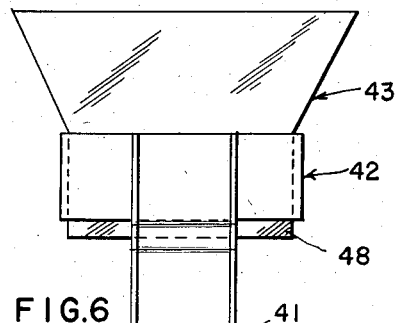
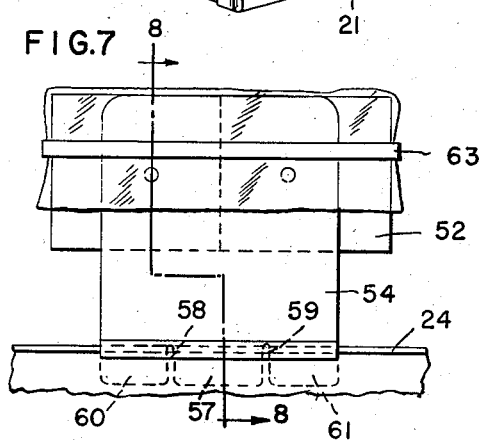
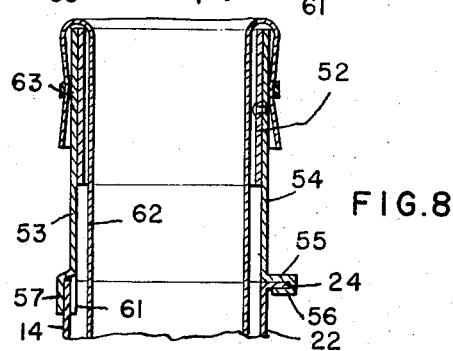
INVENTOR.
Bauman S. Mundie
BY
Shoemaker + Mattare
ATTYS March 15, 1960 B. S. MUNDIE 2,928,259
FROZEN FOOD PACKAGE MOLD
Filed July 24, 1956 2 Sheets-Sheet 2
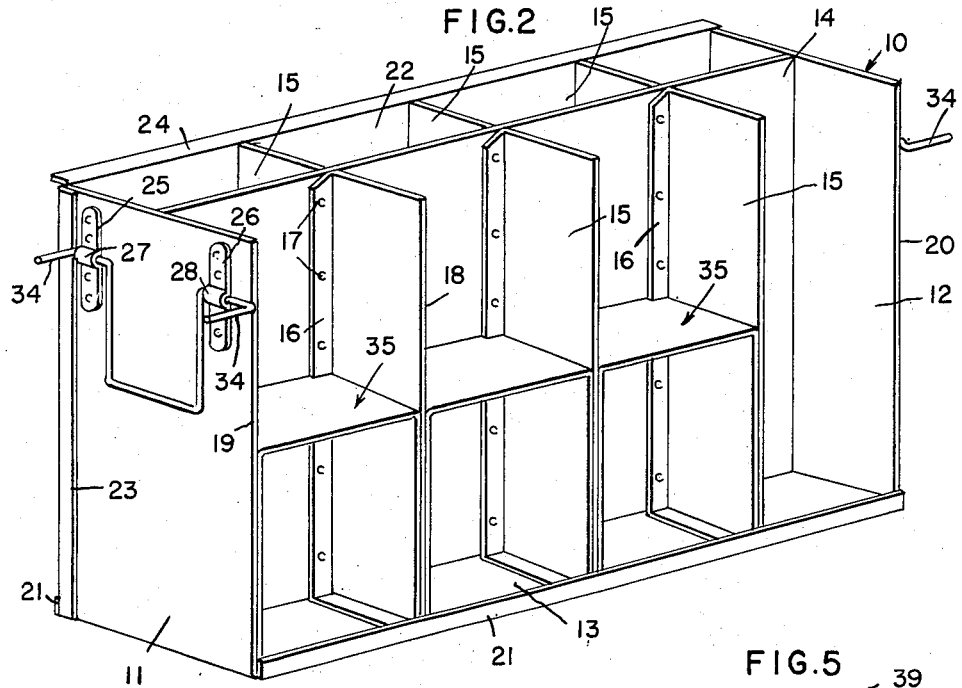
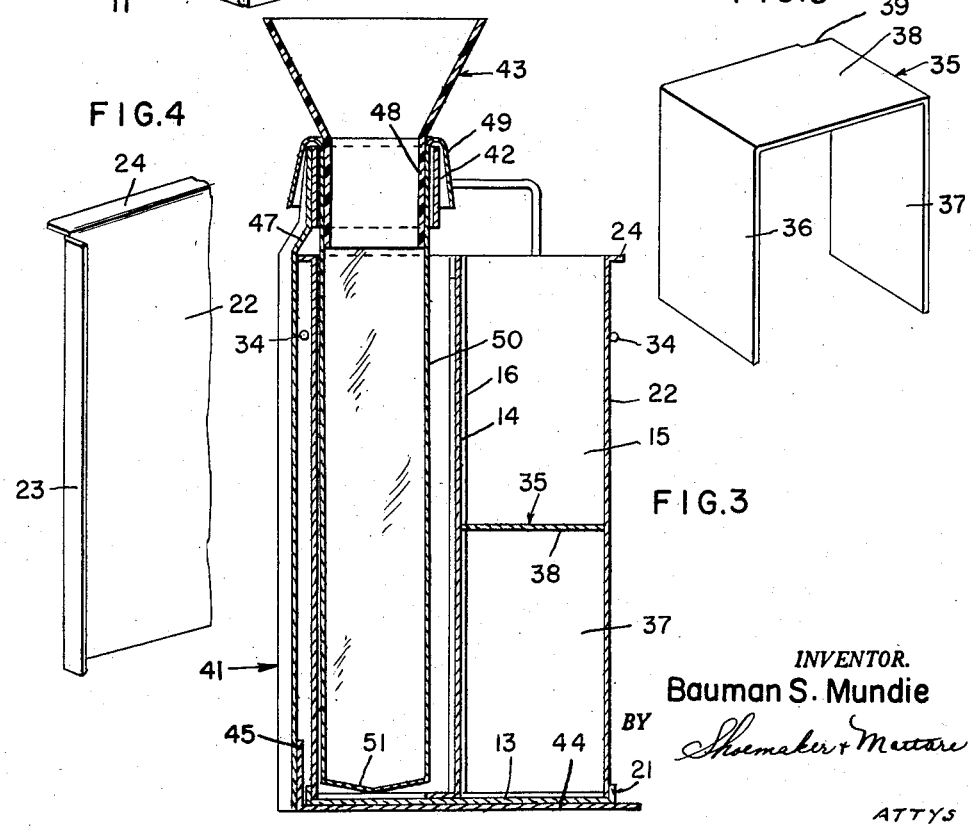
INVENTOR.
Bauman S. Mundie
BY Shoemaker + Mattare
ATTYS United States Patent Office 2,928,259
Patented Mar. 15, 1960

2,928,259

FROZEN FOOD PACKAGE MOLD

Bauman S. Mundie, Hampton, Va.

Application July 24, 1956, Serial No. 599,874

3 Claims. (Cl. 62—300)

This invention relates to accessories for deep freezers and pertains more particularly to a mold assembly for use in molding frozen food packages.

It is common practice to place food materials in plastic bags and place them in a deep freezer, in which case the plastic bag filled with food material may take any shape and consequently they retain their shape when frozen. This practice not only fails to utilize all of the available space within a freezer but it also makes it difficult to stack and neatly arrange the packages of frozen material either in the freezer or in a refrigerator and, generally speaking, the haphazard freezing of food packages in this manner is not entirely desirable.

It is therefore an object of this invention to provide a molding structure which will enable a user to freeze food packages in a predetermined shape, specifically a rectangular shape, such that the frozen packages may be neatly and efficiently stacked within a freezing compartment so as to be readily and easily accessible and so as to utilize substantially all of the available space.

Another object of this invention is to provide a frozen food package mold assembly so constructed and arranged as to impart a maximum of rigidity thereto while at the same time utilizing a minimum amount of material so that the resultant structure is entirely easily and readily portable.

A further object of this invention is to provide a frozen food package mold assembly which is constructed of an elongate sheet of material having its opposite end portions disposed in upstanding relationship to the intermediate portion thereof such that the end portions form and define end walls while the intermediate portion defines a bottom wall and wherein the intermediate portion is provided with an upstanding flange which lies in a plane spaced from but substantially parallel to the adjacent side edges of the end walls to provide a retaining groove for a removable side wall member, while at the same time the flange imparts a maximum of rigidity to the structure.

Another object of this invention resides in the provision of a mold structure in conformity with the foregoing object wherein the side wall is formed of a sheet of material having outstanding flanges on its opposite side edges and an oppositely outstanding flange along its top edge with the bottom edge thereof being disposed within the space defined between the flange on the intermediate portion of the container and the side edges of the end walls thereof, the side flanges of the side wall partially embracing such end walls and forming, together with the flange along the top edge of the side wall, a rigid and yet light-weight assembly.

A further object of this invention is to provide a frozen food package mold assembly which incorporates one or more compartments of generally rectangular configuration, the mold being open topped and having a removable side so that after the packages are frozen, the side wall may be removed and the packages easily removed from the mold for subsequent storage.

A further object of this invention is to provide an assembly in accordance with the preceding object, wherein the mold is provided with pivoted handle members movable between an operative and an inoperative position and so constructed that when in the operative position they serve to retain the removable side or sides in place.

Still another object of this invention is to provide a hopper and bag holding mechanism adapted for use with the mold assembly.

A further object of this invention is to provide removable insert members for use within the compartments of the mold which may be selectively used for producing frozen food packages of lesser volume than the volume of the entire compartment.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:

Fig. 1 is a perspective view of the mold structure with the component parts thereof in operative position and with the bag holding and hopper mechanism associated therewith;

Fig. 2 is a perspective view similar to Fig. 1 but showing one of the side walls removed and omitting the bag holding and hopper mechanism;

Fig. 3 is a vertical cross sectional view taken through the mold structure and illustrating the use of the hopper and bag holding assembly;

Fig. 4 is a perspective view of one end portion of one of the side walls;

Fig. 5 is a perspective view of one of the insert members;

Fig. 6 is a rear elevational view of the hopper and bag holding means;

Fig. 7 is an elevational view showing a modified form of bag holding mechanism; and Fig. 8 is a vertical section taken substantially along the plane of section line 8—8 in Fig. 7.

Referring more particularly at this time to Figs. 1 and 2, the reference numeral 10 indicates generally the mold structure in its entirety. For the purpose of economy in construction and rigidity, the main body portion of the mold structure is formed of an elongate sheet of material, preferably aluminum or other light-weight metal, in which the opposite end portions thereof are bent into upstanding spaced parallel relationship to provide opposite end walls 11 and 12 joined at their lower edges by the intermediate portion 13. In the specific embodiment shown, a plurality of compartments are provided by a partition wall 14 which extends along the longitudinal center of the assembly and which is secured at its opposite ends to the opposed inner faces of the end walls 11 and 12 and which may also be secured along its bottom edge to the inner face of the bottom wall 13. Further, secondary partition walls 15 are provided, each of which preferably supports a laterally bent flange 16 which is spot welded as at 17 to one side or the other of the partition wall 14, the secondary partition walls extending perpendicular thereto and terminating in vertical edge portions 18 which are substantially coplanar and which lie in the same plane containing the vertical outer edges 19 and 20 of the end walls 11 and 12, the purpose of this construction being presently apparent.

The bottom wall 13 is provided along its outer edges with upstanding flange portions 21. These flanges 21 are provided in such a manner that the inner surfaces thereof lie in a substantially vertical plane but are spaced slightly from the opposed portions of the edges 18, 19 and 20 of the secondary walls and the end walls 11 and 12, to thereby provide a retaining groove for the removable side walls 22.

It will be appreciated that in the specific construction shown, the construction of the mold assembly is identical on opposite sides of the partition wall 14 and it is believed sufficient for descriptive purposes to particularly point out the construction only on one side of such partition wall.

Each removable side wall 22 is provided along its opposite vertical edges with outstanding flanges 23 and along its top edge with an oppositely extending outstanding flange 24. When the parts are in operative position as is shown in Fig. 1, the lower edge of each side wall 22 is disposed within the previously mentioned groove which is defined between the inner face of an associated flange 21 and the opposed vertical edges of the partition walls 15 and end walls 11 and 12 with the flanges 23 at the opposite ends of the side wall embracing around the corners of the mold structure. It will be readily apparent that the flanges 23 on the side walls properly locate such side walls with relation to the main body of the mold and prevent relative longitudinal movement between such side walls and the body. At the same time, these vertical flanges 23 in cooperation with the top edge flange 24 serve to provide an extremely rigid structure and one which is not readily deformable or subject to being bowed out due to the pressure of the packaged material disposed within the various compartments provided by the partition walls 14 and 15. At the same time, by so rigidifying the structure, the side walls may be made of light gauge sheet material.

Secured to the outer face of each end wall 11 and 12 are a pair of hinge strips 25 and 26 having intermediate portions 27 and 28 looped outwardly to provide trunnions for the oppositely extending legs 29 and 30 of the handle assemblies 31 and 32. Each handle assembly, as will be seen most clearly in Figs. 1 and 2, incorporates a U-shaped body portion 33 from which the previously mentioned oppositely extending legs 29 and 30 extend and each of such legs 29 and 30 terminates in a laterally bent finger 34. The lengths of the legs 29 and 30 are such that when the handles are in the position shown in Fig. 1, the finger 34 will embrace and lie against the outer faces of the opposite side walls 22 adjacent the upper edges thereof so that the finger 34, taken in conjunction with the flanges 21, will serve to retain the side walls in proper position. Thus, with the handles in the upright position as shown in Fig. 1, the side walls will be retained in place and will be forced to lie in close adjacency to or in contact with the various previously mentioned vertical edges 18, 19 and 20 of the end walls 11 and 12 and the secondary partition walls 15. At the same time, when the handles are moved to their cooperative position such as that shown in Fig. 2, the finger 34 will release the side walls 22 and permit ready removal thereof as is illustrated in Fig. 2 where the near side wall has been removed to expose the interior of the mold assembly.

It is preferred that each of the compartments defined within the mold assembly be of a predetermined volume, for example, of one quart capacity so that a fair degree of measurement of the quantity of food being packaged may be recorded. If it is desired to make smaller packages or should there be insufficient material in any one instance to make up a complete package of the volume of one compartment within the mold, one or more of the various insert members indicated generally by the reference character 35 and as shown specifically in Fig. 5, may be utilized. Several such inserts are illustrated in Fig. 2. For the sake of simplicity, each of such inserts may be formed in the manner shown as to be of U-shaped configuration having depending legs 36 and 37 interconnected at their upper ends by the platform portion 38 which, when the inserts are in place, will serve as the bottom walls for the compartments within which the inserts are used. As is shown clearly in Figs. 2 and 5, the platform portions may be notched as at 39 adjacent the inner edges thereof to provide clearance for the attaching flanges 16 of the secondary partition walls 15. It is to be realized that the inserts may be provided of varying heights so as to achieve a greater or lesser package volume or means may be provided for elongating or diminishing the lengths of the legs 36 and 37 so as to achieve any desired package volume.

The bag-holding and hopper assembly as shown specifically in Fig. 6 includes a base 40, a standard 41, the bag mouth forming ring 42 and the hopper 43. The base 40 incorporates a relatively large horizontal foot portion 44 as is illustrated most clearly in Fig. 3 which is adapted to extend beneath the mold assembly so that the weight of the mold assembly will hold the hopper and bag holding mechanism in place and such base 40 also includes the upstanding flange portion 45 to which the lower end of the standard 41 is spot welded or otherwise suitably attached as indicated by the reference character 46. Preferably the standard 41 is of channel shaped configuration in cross section to impart a maximum of rigidity thereto and adjacent the upper end thereof is provided with an offset portion 47 which extends in a direction toward the opposite or forward edge of the foot portion 44 such that the bag mouth forming ring 42 overlies such foot portion 44 and when the assembly is associated with the mold as is shown most clearly in Fig. 3, the bag mouth forming or retaining ring 42 will be in vertical register above the open top of one of the compartments. The retaining ring 42 is of open rectangular cross-section whereas the spout 48 of the hopper assembly 43 is of such dimensions as to be fairly snugly received therein so that when the mouth 49 of the bag is slipped up through and over the retaining ring 42, as is shown most clearly in Fig. 3, and the hopper spout 48 inserted into the mouth of the bag, the mouth of the bag will be held securely in place by being sandwiched between such spout portion 48 and an inner surface of the retaining ring 42.

With the main body 50 of the bag positioned in one of the compartments as shown in Fig. 3 with the bottom thereof 51 substantially resting on the bottom of the compartment, the food material may be poured into the same through the hopper 43 and when the proper level has been achieved, the hopper is removed and suitable means utilized to tie off the mouth of the bag below the retaining ring 42 or, of course, the retaining ring may be completely removed from the bag and then the tie-off made. In any event, the plastic bag 50 will, by the weight of the food material poured thereinto, expand to conform substantially to the rectangular shape of the associated compartment within the mold such that when the compartments, or as many as necessary, have been filled and the entire assembly placed in a deep freeze, the food packages will be frozen into a shape substantially conforming to the contours of the individual compartments. In other words, the food is frozen into brick package forms so as to be readily stored in a minimum of space.

A modified form of bag holding assembly is illustrated in Figs. 7 and 8. In this form, a retaining ring 52 similar to the previously mentioned retaining ring 42 is provided, the same being of open rectangular configuration. However, secured to the opposite sides of such retaining ring 52 and in depending relation thereto are a pair of leg members 53 and 54. The lower end of the leg 54 is flanged outwardly as at 55 and then bent back upon itself at 56 so as to define a horizontally inwardly opening notch which is adapted to receive the outstanding upper edge flange 24 of an associated side wall 22. At the same time, the opposite leg 53 is provided with a central portion 57 defined between the vertically extending notches 58 and 59, such central portion being deformed outwardly so as to lie in laterally outwardly spaced parallelism to the adjacent tab portions 60 and 61 which are defined between the notches 58 and 59 and the outer edges of the leg 53. This portion 57 and the tabs 60 and 61 are disposed in straddling relation to the top edge of the partition wall 14 so that when the parts are in the position shown in Fig. 8, the bag holding assembly will be properly positioned above an associated compartment. The bag 62 is projected through the retaining ring with the mouth thereof folded back over the top edge of the retaining ring similarly as described in connection with Fig. 3 but, in this instance, for convenience, a rubber band or similar member 63 may be utilized to hold the bag in place by being snapped around the folded-over portion of the bag mouth. A suitable hopper is then used for filling the bag.

It is preferred that the assembly be constructed of aluminum, aluminum alloy or the like which combines the features of light weight and high heat conductivity, making the assembly both more manipulable and more conducive to rapid freezing.

I claim:

1. A mold assembly for freezing food products comprising, a main body portion including an elongate sheet of material having its opposite end portions disposed in upstanding relation to define a pair of spaced end walls and with the intermediate portion defining a bottom wall, a partition wall extending between and secured to the opposed faces of said end walls and the partition wall extending midway between the opposite side edges of said intermediate portion, a plurality of secondary partition walls extending outwardly from opposite sides of the first partition wall and each of such secondary partition walls terminating in a vertical edge with all of such vertical edges on the same side of said first partition wall being coplanar with each other and the corresponding vertical side edges of said end walls, each side edge of said bottom wall having an upstanding flange and each flange having its inner face spaced from the opposed vertical edge portions of the end walls and secondary partition walls to define a retaining notch therewith, a removable side wall engaged against each series of vertical edges on opposite sides of the partition wall to define a plurality of open topped compartments within the mold, the bottom edge of each side wall being snugly received within a corresponding retaining notch, means for releasably urging each side wall against its corresponding series of vertical side edges to hold the same in place, said means comprising a handle secured to the outer side of each end wall, each handle including a generally U-shaped hand portion having oppositely laterally extending projections at its free ends lying parallel to and hinged to the said end walls, and each of such projections terminating in an outstanding finger portion, said hand portion and said projections being coplanar and said fingers being parallel and disposed at right angles to the hand portion, whereby when the bight of the hand portion is uppermost, said finger portions embrace the outer surfaces of said side walls to hold them in place.

2. A bag supporting assembly comprising a ring adapted to receive the mouth of a bag therethrough with the mouth turned back over the top of the ring, a pair of legs secured to and depending from the opposite sides of said ring, and each leg terminating in a foot for anchoring said ring to an associated mold in vertical register above a compartment thereof, one of said feet comprising alternately offset tabs for straddling the rim of the mold and the other foot comprising a horizontally disposed U-shaped edge of said leg defining an inwardly opening recess for receiving a lip on the mold.

3. The assembly as defined in claim 1 including a bag supporting assembly comprising a ring adapted to receive the mouth of a bag therethrough with the mouth turned back over the top of the ring, a pair of legs secured to and depending from opposite sides of said ring, and each leg terminating in a foot for anchoring said ring respectively to said partition wall and said removable side wall to hold a bag in registry within a desired compartment.

References Cited in the file of this patent

UNITED STATES PATENTS

| | | |
|---|---|---|
| Re. 14,887 | Dalton | June 22, 1920 |
| 169,959 | Clark | Nov. 16, 1875 |
| 484,459 | Reynolds | Oct. 18, 1892 |
| 798,019 | Deuel | Aug. 22, 1905 |
| 893,926 | Hotchkiss | July 21, 1908 |
| 926,246 | Dorff | June 29, 1909 |
| 1,130,960 | Carter | Mar. 9, 1915 |
| 1,140,867 | Bates | May 25, 1915 |
| 1,312,626 | Grannis | Aug. 12, 1919 |
| 1,435,637 | Goldman | Nov. 14, 1922 |
| 1,504,530 | Thomas | Aug. 12, 1924 |
| 1,735,082 | Martin | Nov. 12, 1929 |
| 1,843,038 | McIllvain | Jan. 26, 1932 |
| 2,011,244 | Hannaford | Aug. 13, 1935 |
| 2,040,003 | Jorgensen | May 5, 1936 |
| 2,109,102 | Cocks | Feb. 22, 1938 |
| 2,282,548 | Stover | May 12, 1942 |
| 2,527,894 | Tacchella | Oct. 31, 1950 |
| 2,552,400 | Brunia | May 8, 1951 |
| 2,637,477 | Tucker | May 5, 1953 |
| 2,682,966 | Wiepert | July 6, 1954 |
| 2,688,429 | Davison | Sept. 7, 1954 |
| 2,718,326 | Le Blanc | Sept. 20, 1955 |
| 2,728,480 | Close | Dec. 27, 1955 |

FOREIGN PATENTS

| | | |
|---|---|---|
| 106,746 | Australia | Feb. 22, 1939 |